Jan. 5, 1943.   G. W. JOHNSON   2,307,589
DISPENSER BEVERAGES
Filed Jan. 15, 1940   3 Sheets-Sheet 1
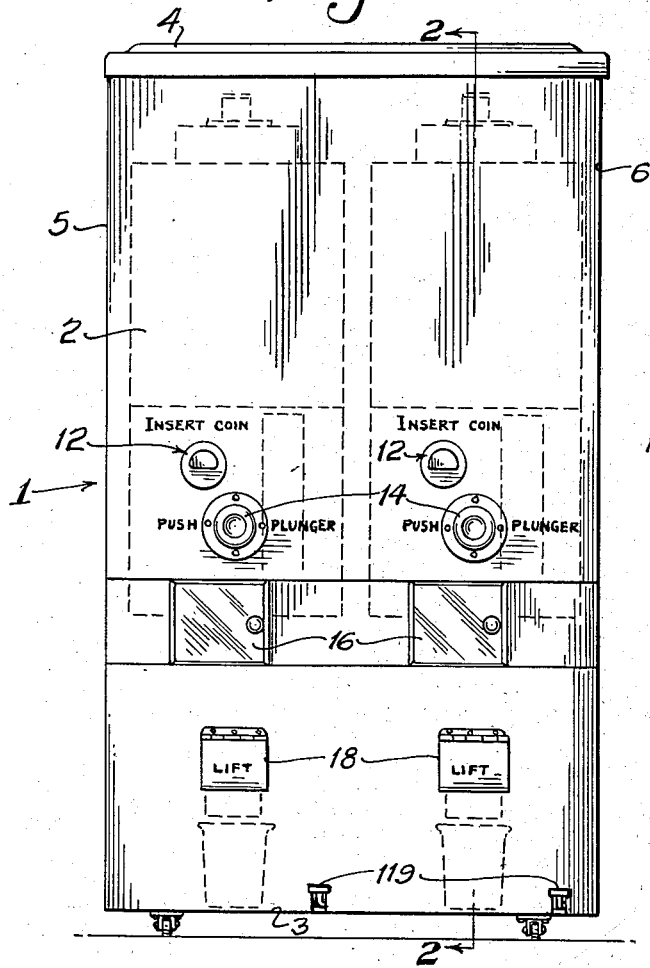
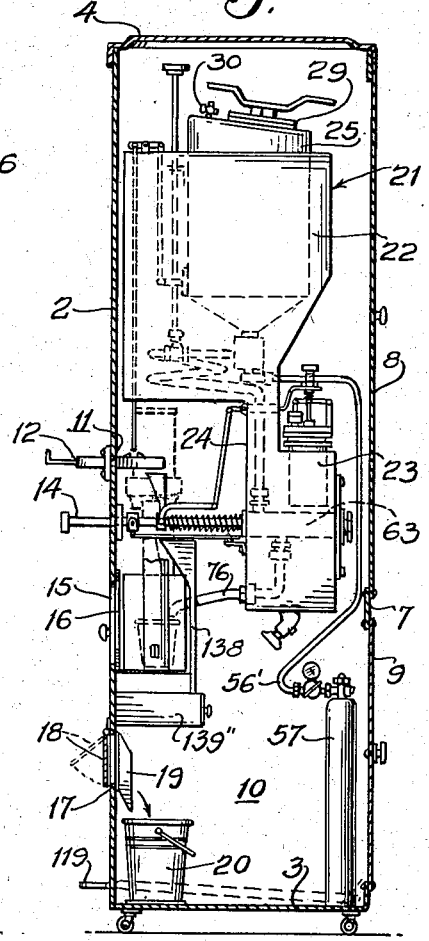
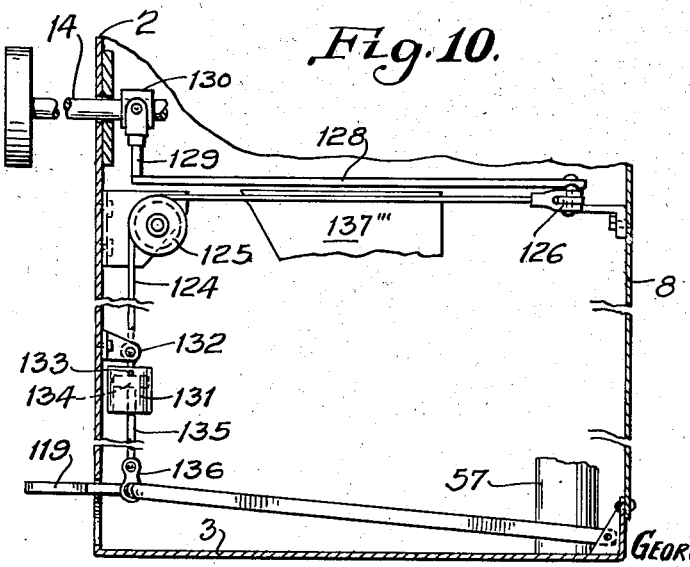
INVENTOR.
GEORGE W. JOHNSON
BY
Earl E. Moore
ATTORNEY.

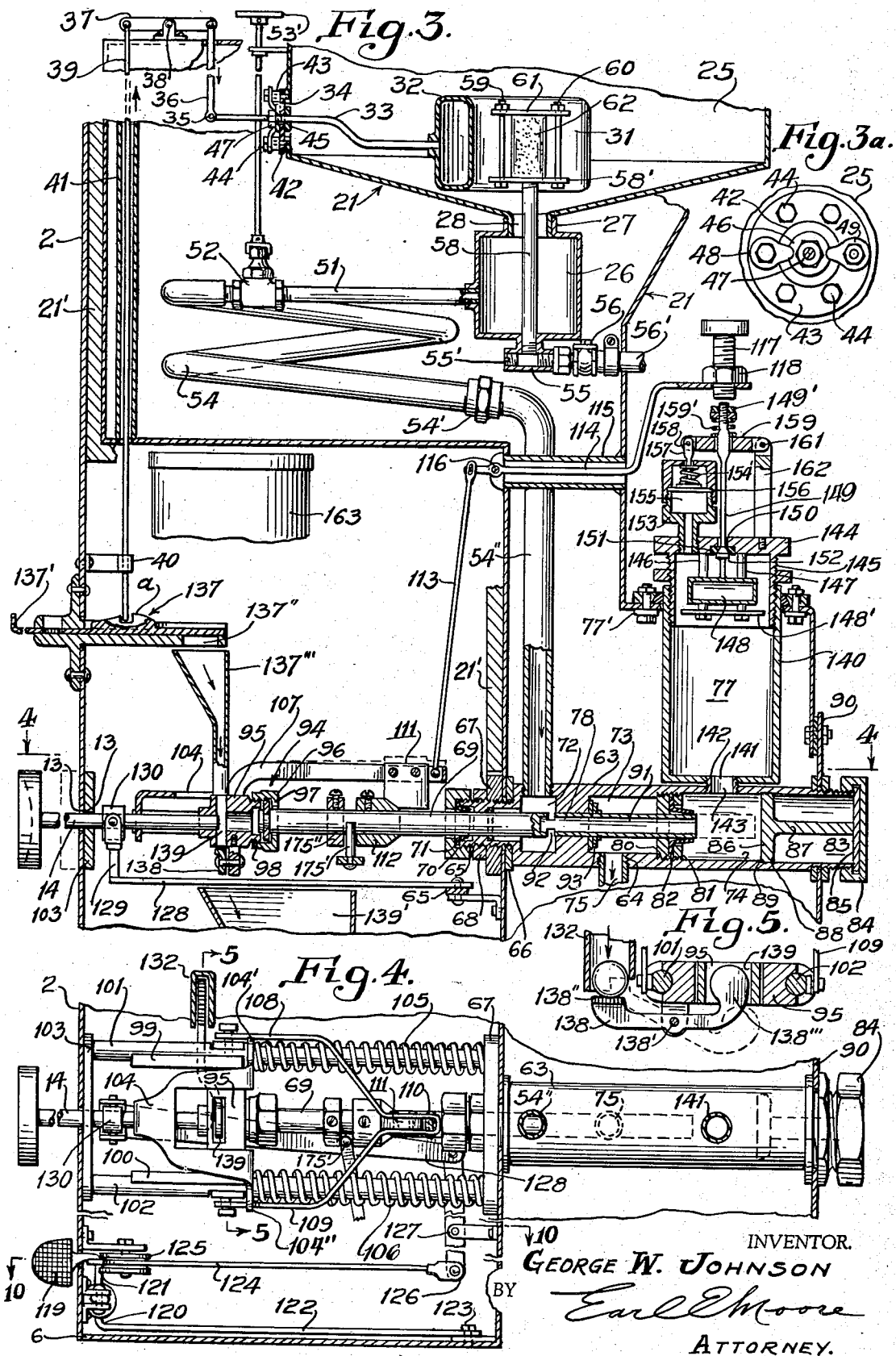

Jan. 5, 1943.   G. W. JOHNSON   2,307,589
DISPENSER BEVERAGES
Filed Jan. 15, 1940   3 Sheets-Sheet 3

INVENTOR.
GEORGE W. JOHNSON
BY Earl E Moore
ATTORNEY.

Patented Jan. 5, 1943

2,307,589

UNITED STATES PATENT OFFICE 2,307,589

DISPENSER FOR BEVERAGES

George W. Johnson, Beverly Hills, Calif.

Application January 15, 1940, Serial No. 313,904

10 Claims. (Cl. 225—21)

This invention relates to coin controlled means for dispensing beverages and to steps of procedure in preparing the beverage so that it is in a highly palatable state when dispensed for use.

So far as known, the prior art does not make any provision for completely blending beverages, reference being made chiefly to carbonated soft drinks, so that when the customer receives his glass or cup of the beverage, it is in a fully blended and carbonated condition. Unless a certain amount of time elapses after the mixed liquid and flavor is carbonated or charged with $CO_2$ gas before dispensing it, the beverage will not have the smoothness nor uniform texture desirable in such drinks for palatability. It is not enough to merely add carbonated water to a measured amount of a flavored syrup and then agitate the mixture with $CO_2$ gas or by other means just prior to or during the process of dispensing the beverage. The beverage must remain in an apparent quiescent state after being charged with gas to give it chance to blend thoroughly. The gas, liquid and flavor must be evenly diffused together in order for a beverage dispenser to compete with the quality of bottled or canned goods.

In accordance with applicant's method, the thoroughly mixed liquid and flavor constituents of the beverage are stored in a refrigerated reservoir under a constant carbonation action, small portions thereof being drawn from the reservoir as demand requires, such small portions being supercharged with carbon dioxide gas as they pass from the reservoir; the excess gas slowly percolating through the main body of the liquid to carbonate it and to break vacuum conditions above the sealed reservoir due to the lowering of the liquid therein. The small portions of the supercharged liquid and flavor are then stored in a small chamber for re-absorption of any small amounts of $CO_2$ gas disturbed from the former perfect solution by agitation and friction due to its passage into the small chamber. The beverage is measured before dispensation by an adjustable small chamber, the volume of which can be easily changed without disconnecting parts of the apparatus, and is under a uniform treatment of refrigeration from the point of storage in the reservoir until dispensed for use.

The carbonating step of the process does not cause undue agitation of the beverage so as to create foam, loss of gas causes foam and this is purposely avoided in all phases of the method. Agitation is avoided even to the point where the beverage is dispensed into the cup or glass and made ready for the customer's use. The gas is charged into the liquid in the form of a fine mist so that the liquid in the reservoir can quickly absorb and saturate itself with the gas. The spout, at the point of delivery of the beverage, is positioned with respect to the cup or glass in a manner that the issuing beverage flows quiescently along a wall of the cup or glass so that there is no splash and hence, foaming with consequent loss of gas. Means are provided to prevent entrance to the cup filling chamber until the vessel has been filled with a measured quantity of the beverage. Since the entire device is sealed from the atmosphere and splash and foam avoided, the best of sanitary conditions prevail and thus makes the entire dispensing unit always attractive and inviting.

A special valve mechanism is provided, the working parts of which are easily accessible and can be removed for repairing or renewal without disturbing the valve casing or other parts of the machine, and particularly without polluting stored beverage. Means are also provided to prevent operation of the dispensing valve when the reservoir is empty, because of other means preventing operation of the coin device.

Loss of carbonating gas is even prevented in the measuring chamber, for its pressure, through use of a new and easily operated device, is used to close the vent thereof when the float's needle valve closes due to filling the chamber. The escape of gas is stopped at a predetermined point by automatic closure of the vent. When the valve is operated to empty the chamber, the vent is automatically opened to release the gas pressure and thus allow easy gravity discharge of the beverage.

Each dispensing unit is small and, therefore, can be readily combined with similar units to form a bank for dispensing a plurality of beverages. Each unit may have its own individual cabinet and support, or all units may be housed in a single cabinet with but a single support. The units are just as simple in construction as possible commensurate with its practicability, sanitation and attractiveness.

A coin control unit is provided for allowing the machine to be operated either by hand or foot. The coin itself is not a part of the operative mechanism, but shifts a specially designed lever with a flat metal plate on one end into a predetermined position so that the flat plate enters the valve mechanism so that the machine can be operated. Without substantially full movement of the lever, the dispensing mechanism remains disengaged from foot pedal or hand button and can not be operated. Since the machine is rendered operable by a flat metal plate or finger, at the end of the specially designed lever, which is always the same in size and mobility, the likelihood of clogging or jambing the mechanism is reduced to a minimum.

The prime object of the invention is to provide a liquid dispensing machine designed to scientifically carbonate beverages and direct the movement thereof in a manner that there be a minimum of carbonation loss and dispense the beverage in a completely blended and carbonated condition.

An important object of the invention is to provide a beverage dispensing machine wherein is provided a main beverage container with contents under continual temperature and pressure regulation, and withdrawing predetermined measured amounts as required under the above mentioned pressure and temperature conditions, but discharging same under atmospheric pressure by gravity due to the operation of special pressure discharge vent valve.

Another object of the invention is to present a liquid dispensing machine that is fool proof, sanitary, attractive, easily accessible for repairs and for renewing its working parts without interference with the liquid therein, yet simple in construction and economical to manufacture.

Another object is to provide means for cooling the entire liquid tract of a dispensing machine so that when the liquid is once cooled, it remains cooled throughout its entire journey from the storage reservoir to the delivery spout.

Another object is the provision of means and methods for preparing a palatable beverage and delivering it ready for use in a clean and sanitary manner and in a high state of palatability.

Another object is the provision of a gravity feed tract from the final storage reservoir of the liquid to its point of delivery into a portable vessel, all parts of the liquid tract being adjusted and arranged in a manner to avoid loss of gas therefrom, even to the point of actual delivery into the drinking cup or glass.

Still another object is to provide remote coin control means for placing the liquid dispenser in condition ready for operation; and means are also provided to lock the coin control mechanism when the dispenser is not prepared to deliver a full measure of the liquid without jeopardizing the satisfactory operation of the machine on subsequent deliveries.

Other objects, advantages and features of my invention will appear from the accompanying drawings, the subjoined detailed description, the preamble of these specifications and the appended claims.

Applicant is about to illustrate and describe one of the forms of his invention in order to teach one how to make, use and vend the same, but it is to be understood that the drawings and description thereof are not to limit the invention in any sense whatsoever, except as limited by the appended claims.

In the drawings:

Fig. 1 shows the invention in front elevational view.

Fig. 2 shows a vertical cross section of Fig. 1.

Fig. 3 is an enlarged detail of the operative parts of the invention, most parts being shown in section.

Fig. 3a shows a fragment of Fig. 3 in elevational view.

Fig. 4 is a detailed part taken substantially along the line 4—4 of Fig. 3.

Fig. 5 is another detailed part taken substantially along the line 5—5 of Fig. 4.

Fig. 10 is a vertical view, partly in elevation and partly in section, showing alternative means for operating the dispensing machine.

Figures 6, 7:
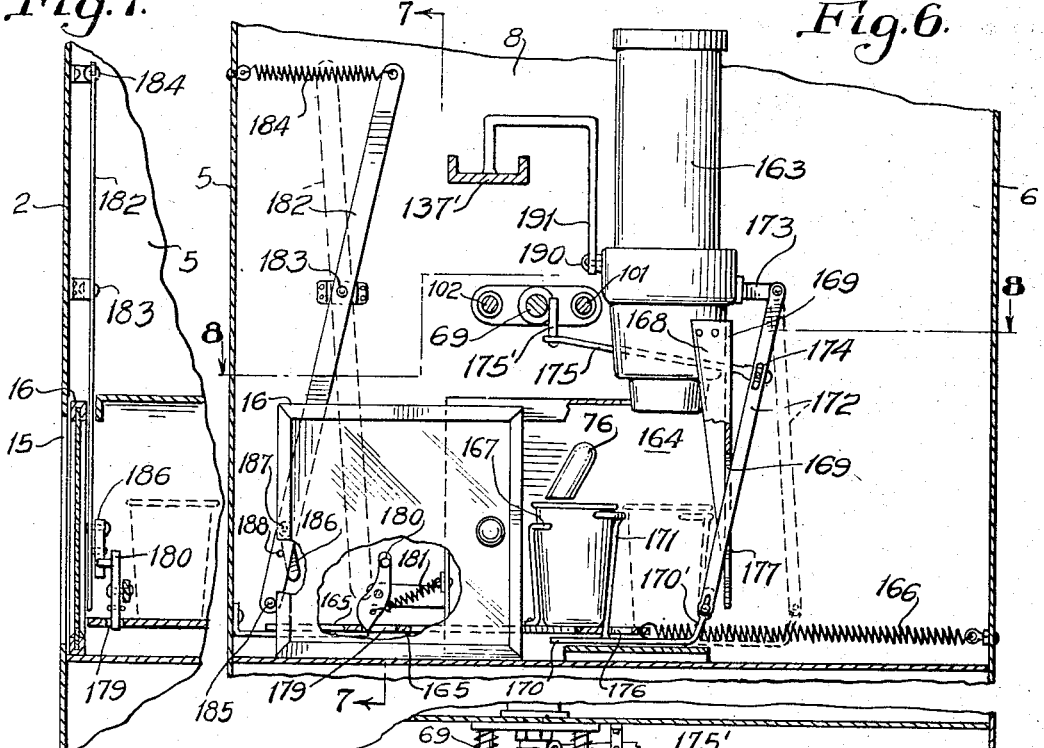
Fig. 6 is an enlarged elevational view, partly in section, showing a detail of the invention.
Fig. 7 is a partial sectional view taken substantially along the line 7—7 of Fig. 6.
Figure 8:
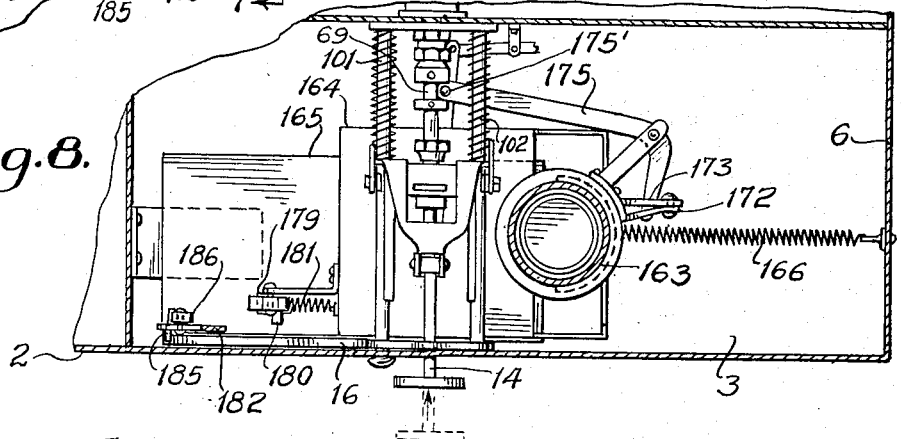
Fig. 8 is a plan view, partly in section taken substantially along the line 8—8 of Fig. 6.
Figure 9:
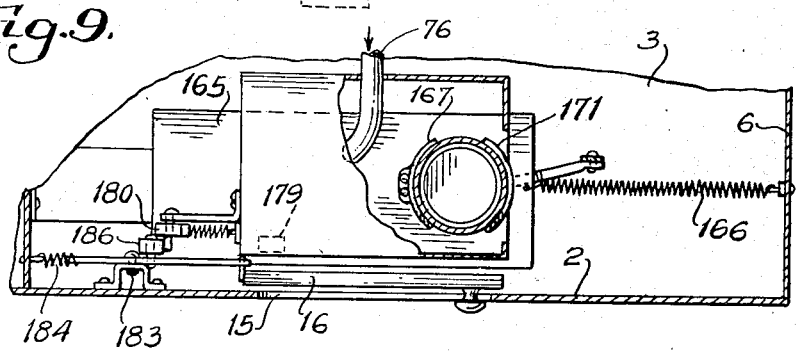
Fig. 9 is a view similar to Fig. 8 showing the sup shifting mechanism in a different position.

The numeral 1 indicates the cabinet or some suitable enclosure for the working parts of the dispensing machine that should not be exposed to the atmosphere or to damage. Although the cabinet may be made of opaque materials to obscure the internal parts thereof, it may be constructed wholly or partly of some transparent material such as glass and the like.

The cabinet has a front wall 2, bottom wall 3, top wall 4, sides 5 and 6, and back wall 7. The actual construction of the cabinet is of no importance except that it should seal the inner chamber thereof from the dust and dirt of the outer atmosphere and have doors such as 8 and 9 for access to the upper and lower parts of the chamber 10. The cabinet may be wide enough to house a plurality of dispensers side by side so that different flavored liquids can be dispensed from the same cabinet, or each dispenser may have its individual cabinet. Nevertheless, the front wall in front of each dispensing unit should have an opening 11 to accommodate a coin slider 12; an opening 13 to receive the push rod 14; an opening 15 closable by a sliding door 16, preferably glass; and an opening 17 provided with a flap 18 hinged to the upper edge of the opening. This opening is provided on the rear side thereof with a short chute 19 to guide used cups into a waste container 20.

In the upper part of the chamber 10 is an ice tank 21, the top of which may be open or closed, and if closed, provided with a suitable cover that can be opened to clean the tank or replenish it with ice. In the event that mechanical refrigeration is preferred, evaporator coils may be installed in the tank and the compressor, condenser, etc., placed in the bottom of chamber 10 where there is ample room. The bottom walls of the cabinet should then be provided with vents to permit air to circulate through the condenser and carry the heat of compression away from the condenser and tank to the outer atmosphere. Ice may be loaded into the tank through the opening at the door 8 or through the top of the cabinet by removing the cover 4. The numeral 21' indicates insulation that should entirely surround the tank.

The tank 21 has a large upper section 22 and a lower smaller section 23, a neck portion 24 connecting the sections together. Any suitable bracket means may be used to support the tank on the cabinet walls. The upper tank section is provided with an inverted liquid container 25 which contains the beverage to be dispensed from the machine. Below the container is a relatively small container 26 having a flanged opening 27 at its top to receive the flanged port 28 of the container or reservoir 25, as shown. Any suitable means may be employed for sealing the opening and port so as to avoid leakage of liquid, solder, welding or packing may be resorted to or the two threaded together. An opening at the top of the container 25 is closed by a threaded plug 29. A blow-off valve 30 at the top of the container provides a means for equalizing the pressure within the container and without, when desirable. Any type or kind of means may be employed for supporting the containers 25 and 26 such as by brackets fixed to the inner walls of the tank. Suitable insulation may be used where necessary to minimize influx of heat to refrigerated parts.

In the container 25, there is a float unit indicated in general by the numeral 31. The float consists of a hollow and closed metallic unit having the general plan view of the letter U. The float is attached to an offset rod 33 which pass through an opening 34 of the container. One end of the rod is screwed to or otherwise fixed to the float and the other end pivoted at 35 to a link-rod 36. The upper end of the link-rod is pivoted to one end of a lever 37 which has its central portion pivoted to a support 38. The other end of the lever is pivoted to a long push rod 39, this rod passing through the bottom of the ice tank and braced by a bracket 40 which permits the rod 39 to slide therethrough. A tube 41 protects the rod from the ice in the tank and also prevents loss of water from the tank as it extends well above the water surface and has its bottom fixed to the tank wall in a water tight manner, such as by welding.

To prevent loss of liquid from the container 25 and also to provide the rod 33 with a suitable pivot support, the opening 34 is covered by a flexible disc 42, such as rubber and the like, the tank opening about its perimeter, is embossed to form a reenforced collar against which the disc is placed. A ring 43 is provided on the outer side of the disc and is held in a water tight manner against same by a plurality of bolts 44. These bolts are threaded into the embossed collar, and when tightly set, prevent leakage from the container and also provide a pivot support for the rod 33. The rod passes through a central opening in the flexible disc. Fixed to the rod, as by welding or soldering, is a metallic washer 45. On the opposite side of the disc is a washer 46 arranged to be forced against the disc by a nut 47 which is threaded to the rod. The threads on the rod need only run a short length thereof since the nut 47 does not require much running space. When the nut is tightened against the washer 46, the disc 42 is wedged between and because of its elastic properties, prevents leakage of liquid from the container.

To make certain that the disc 42 will not flex too much and to facilitate pivot action, fingers 48 and 49 are provided under diametrically opposite nuts 44. These fingers with their tips positioned in slots on washer 46 hold the disc in proper alinement and also allow sufficient pivot action for the rod 33.

The chamber 26 has a side port 50 to which is connected a pipe 51 having a valve 52 at the far end thereof. This valve is operated by a long rod 53 which extends well above the water line of the ice tank and is provided with a turn handle 53'. The valve 52 is connected to a flexible tube 54 which is provided at its other end with a coupling 54'. The coupling joins the flexible tubing to the rigid upright pipe 54''.

At the bottom of the container 26 is an opening having its periphery soldered or welded to the top port of a pipe T-joint 55. One of the side ports of the T-joint is closed by a plug 55' and the other side port connected to one end of a check-valve 56 which has connection with a pipe 56' leading to the bottom of the chamber 10 and makes connection with a drum 57 containing carbon dioxide liquid and gas under high pressure.

A pipe nipple 58 is threaded into the top part of the T-joint and extends upwardly through the small container 26 into the large container 25 to a point just beyond the port 28 as shown. The top of the nipple is screwed into a winged flange 58', near the wing ends of which are holes for receiving the bolts and nuts 59 and 60. A similar winged flange 61 is provided at the top of the bolts. Wedged between the flanges 58 and 61 is a porous element 62, the purpose of which is to emit the carbon dioxide gas from the drum 57 into the container 25 as a fine mist. This element 62 may be made of porous stone or clay material, or some composition material. Porous stone is preferred because in practice it is very satisfactory for the purposes desired, that is, the emanation of a fine mist so that the liquid can quickly absorb $CO_2$ gas.

The numeral 63 designates the valve assembly, part of which, the liquid carrying elements, is bathed in the cool water of the tank and the other parts which are the major controls for the valve and which extend from the tank to the front wall of the cabinet. The liquid control end of the valve consists of a hollow body 64 having at one end an integral running threaded nipple 65 which passes through a hole in the tank wall. Between a shoulder of the valve and the tank wall is a resilient gasket 66 and on the other side of the wall a cross bar 67, both of which are wedged to the wall by a lock nut 68. The bore of the nipple provides a bearing for the valve stem 69. To prevent leakage, a frusto conical-like gasket 70 is fixed between the nipple end and a flange nut 71, as shown. Pressure from the liquid end of the valve causes the resilient gasket to snugly grip the periphery of the valve stem and thus makes a perfect seal to prevent leakage.

The body of the valve is divided into chambers 72, 73 and 74, the chamber 72 having connection with the pipe 54'', chamber 73 with a pipe 75 which leads to a discharge spout 76 and the chamber 74 which has connection with a measuring chamber 77. The chambers 72 and 73 are separated by a wall 78 which not only isolates the two chambers, but also provides a guide and bearing for a portion of the valve stem 69.

Chambers 73 and 74 are separated by a partition 79 which consists of a pair of lock nuts 80 and 81 between which is wedged the flange portion of another frusto conical-like gasket 82, note that the nut 81 has a large bore to allow free movement of the gasket so that it can be snugly pressed onto the valve stem by liquid pressure in chamber 74. The valve chamber 74 is larger in diameter than chamber 73 so that it can be threaded to accommodate the nuts 80 and 81 in a manner that these nuts can be removed from the chamber through its open end 83; the open end being closed by a removable threaded cap 84 and disc 85. Within the chamber 74 is a liquid stop element 86 having a stem 87 and a disc-head 88 arranged to press against the circular shoulder 89 so as to provide a seal and prevent liquid reaching the disc 85. A removable plate 90, sealed to the wall of the tank and to the valve casing, as shown, provides a means for removing the valve casing should it ever become necessary.

The valve stem 69 has a hollow portion 91 at one end thereof, one end of the hollow portion being entirely open and the other end provided with lateral wall openings 92 which may be shifted, by moving the valve stem, from chamber 72 to chamber 73. To prevent leakage between the valve stem and bore of 78, a packing element 93, comprising a gasket, washer and ring are provided, the ring being partly counterseated in the hollow valve stem, as shown.

The valve stem 69 extends from the valve body or casing 63 to a connector 94 which is attached to a cross bar 95. The cross bar has a bore in alinement with the valve stem. This end of the valve stem has an annular recess into which snugly fits a split ring 96. A flanged nut 97 is threaded to a male threaded protrusion 98 of the cross bar and thus securely holds the valve stem in positive floating connection with the center portion of the cross bar. The cross bar is provided with concaved wings 99 and 100 on both sides thereof which are in snug sliding contact with their respective guide rods 101 and 102. The rods have one of their ends fixed to the cross bar 67 and the other ends to a cross bar 103, this bar having a central hole to accommodate the push rod 14.

A straddling element 104, Fig. 4, has a bossed portion which slides along rod 14 and legs which straddle a cross bar 95 and the wings 99 and 100. The legs terminate in ringlets which encircle their respective guide rods 101 and 102. Each guide rod is provided with a compression spring, springs 106 and 105, which continually urge the cross-bar 95 toward the front of the cabinet 2 by pressure against it via straddling members 104' and 104".

A forked element 107 has legs 108 and 109 whose ends are pivoted to the sides of the guide bars 101 and 102 respectively, as shown. The legs terminate into a bow-like portion 110 which envelope and join to a rider block 111 having a lower corner thereof bevelled. Fixed to the valve stem is an adjustable cam-block 112 having an upper corner bevelled and arranged to contact the bevelled corner of the rider 111 so as to raise it and the bow-like end of the fork 107. Pivoted to the end of the fork is a rod 113 pivotally connected to an end of a rod 114. This rod is configurated as shown and passes through a pipe 115 of the ice tank. The rod is pivoted at 116 and has a threaded hole at the far end thereof into which is an adjustment screw 117 having a lock nut 118. The purpose of this screw will be explained later.

The valve stem is operated by a foot treadle 119 as well as by the hand push rod 14. The foot treadle is part of a long rod 120 in the form of a right angle having a short leg 121 and a long leg 122. An end of the long leg is pivoted to the side of the cabinet at 123. Near the treadle is connected a flexible cable 124 which passes over a suitably supported pulley 125 and then connected to the end of a lever 126. This lever is pivoted to a bracket 127, as shown, and has its far end pivoted to a push bar 128. The forward end of the push bar has an upstanding fork 129 which is fixed to a collar 130 having fixed connection to the push rod 14.

To prevent quick movement of the treadle 119 and push rod 14, a dash pot 131 is provided and fixed to the front wall of the cabinet by a bracket 132. The dash pot has a small vent hole 133 and the plunger or piston 134. A piston rod 135 is pivoted to short leg 121 by a connector 136. The connection between the dash pot and bracket 132 should be a pivot so as to allow the pot to rock slightly.

The machine is coin controlled and utilizes the well known slidable coin plate 137. Any known coin receiver suitable for operating this invention may be used. The coin selecting mechanism includes a plate 137' having a hole of the size required to receive the coin desired, such as a nickel or dime. When the coin-plate is pushed into the machine, the coin drops through a hole 137", and into the passage 137'". This construction is old in the art and will not be further described.

In this invention, however, the coin is arrested at the bottom of the passage by the end of a coin lever 138 which is pivoted at 138' on a bracket fixed to the cross bar 95 so that it will reciprocate therewith. One end of the lever has a coin stop 138" which is positioned as shown in Fig. 5 when the machine is idle. This stop consists of a platform of desired length so as to hold the coin in place until the valve actually opens, then the coin falls past the stop. The other end of the lever is provided with a dummy coin or the like 138'" which enters the slot 139 when the proper size and weight of coin rests on the stop 138". Whenever a coin has thus raised lever end 138'" and the push bar 14 is forced inwardly by either hand or foot pressure, the inner end of push bar 14 engages flattened end of lever 138'" which being pivoted to bar 95 and reciprocating therewith allows forward motion of rod 14 to be transmitted to bar 95 and thence to valve stem 69. Further inward pressure on the push rod 14 carries it and the valve stem still farther to the right, as shown in Figs. 4 and 5, and removes the coin stop 138" from the bottom of the passage 139 so that the coin can then fall into the chute 139' and then into the coin drawer 139".

The measuring chamber 77 is an open top cylindrical container 140 having a hole through its bottom as indicated at 141 which is provided with a nipple 142 which joins with a similar hole 143 at the top of the valve chamber 74. The top of the measuring chamber is provided with a closure having a plate 144 and a dependent threaded flange 145 which engages internal threads at the top of the measuring chamber. The purpose of this adjustable cover being so that the volume of the measuring chamber may be varied in accordance with the exact amount of liquid to be dispensed. Depending from the plate 144 are studs 146 and 147 having heads at the bottom thereof which support in fixed relation thereto a baffle plate 148 as shown. Riding between the studs is a hollow float 146 having a valve rod or stem fixed to the center thereof as indicated at 149. This valve stem passes upwardly through a hole in the cover and terminates just short of the screw 117. The hole 150 in the cover is provided with a valve seat 151, which is preferably rubber. The lower end of the valve stem is provided with a tapered valve head 152 which is arranged to close the valve opening whenever the stem is moved upwardly by the float 148.

In order to positively force the valve head onto its seat and make a complete and perfect seal, and in order to prevent the loss of gases in the chamber 77, an open top cylindrical container 153 is provided having its bottom opening into the top of the measuring chamber as shown. The top of this container 153 is threaded to receive a threaded inverted container 154 to provide a closed chamber 155. Between the containers 153 and 154 is wedged a flexible diaphragm 156 preferably of rubber having at the center thereof a rod 157 which is pivoted at 158 to a rocking beam 159. The other end of the rocking arm, as at 161, is pivoted to the upper end of a standard 162, the lower end of which is securely fastened to the cover. By this arrangement, any fluid pressures within the chamber 155 will act upon the bottom of the diaphragm 156 and spring same upwardly so as to carry the valve stem 149 upwardly and hence supply additional force to securely close the valve opening.

A coil spring 154' is provided on the rod 157 between the cover and the diaphragm, and another coil spring on the valve stem between the lock nuts 149' and the rocking beam. Unless the springs were used, the pressure against the beam would be too great. Adjustment of spring 159' makes it easy to use whatever pressure is necessary to assure tight closing of the valve 150. This adjustment allows easy release of the pressure in the measuring chamber when dispensing takes place. Spring 154' merely serves to keep the rubber diaphragm down so as to increase the stroke of rod 157.

Any suitable liquid sealing device may be employed to prevent water leakage between the measuring chamber 77 and the opening of the tank. Such a seal may be a gasket unit as indicated in general by the reference character 77'.

The elongated container 163, note Fig. 6, is fastened to the front wall of the cabinet and contains a plurality of paper cups. The bottom of the container opens into a pouring or filling chamber 164, the front of which is provided with the transparent sliding door 16. Along the bottom of the container 164 is a sliding plate 165 having one end thereof fixed to a tension spring 166 which is anchored to a side wall of the cabinet. On the top surface of the plate is an open basket or wire type cup holder 167 having circular top arms which have a diameter slightly greater than the diameter of the cup so that the cup can be easily dropped into the frame or removed therefrom. Fixed to the bottom of the cup holder is a scoop-like cup guide 168 which has an opening 169 for a purpose later to be apparent.

Beneath the sliding plate 165 is another sliding plate 170 which has fixed thereto an upstanding wire cup frame 171. When the wire frames are positioned as shown in Fig. 6, they form a cup holder. The under plate 170 is shifted by a bar 172 which has its upper end pivoted to a bracket 173 and its lower end pivoted to an extension 170' of the under plate. The lower end of the bar is slotted to allow freer movement of the bar and plate. Near the upper end of the bar is a slot 174 in which rides a pivot pin connected to the end of a rod 175. The other end of the rod has a pin 175' which is held in position for movement with the valve stem 69 (see Fig. 3) by an adjustable collar 175".

The plate 165 is provided with a slot 176 to accommodate the independent movement of the wire cup arm 171 which is rigidly attached to the under slidable plate. At the opposite end of the plate is a cut out section 179 arranged to receive one end of a pivoted dog 180 under the tension of the spring 181. The pivot pin of the dog is fixed to a bracket extending from a side wall of the filling chamber. One end of the spring 181 is also fixed to the wall of the chamber. A stop is provided so that the dog will not rotate further in a counter clockwise direction than the position shown in Fig. 6.

The releasing device for the dog 180 consists of a flat bar 182 pivoted at 183. One end of the bar is connected to a spring 184, as shown, and the other end is provided with a pin 185 which protrudes far enough to engage the vertical end frame of the door 16. A short bar 186 is pivoted at 187 to the bar 182 and is prevented from moving in one direction by a stud 188. The short bar 186 is free to ride over the top of the dog 180 when the door is opened, but will function to trip the dog when the door is closed because the spring 184 will force the short bar against the dog when the spring closes the door through operation of the bar 182. Tripping of the dog, shifts the plate back to the right by action of the spring 166.

The under plate 170 returns home prior to the upper plate 165 because it is operated by the main valve stem, this stem returning to its normal position when the push rod 14 or the foot treadle 119 is released.

The cup dispenser is any suitable type for the purposes intended, and since the cup dispenser per se is not an inventive part of this application, no specific one is shown in detail. There are numerous cup dispensers on the market, any one of which could be used in this invention. The preferred cup dispenser, however, is the one that discharges the tumbler type by the mere push on a spring controlled lever. Such a lever is shown at 190 in Fig. 6 of the drawings. The lever is operated in one direction, for discharging a cup, by the angled arm 191; the lower end of which shifts the cup dispensing lever 190 and the upper end of which has welded connection with the coin slide 137'.

*Operation*

The container 25 is first supplied with the beverage to be carbonated and dispensed or with a flavored syrup and the proper amount of plain water. Cover of container being closed, the container may be shaken for a preliminary manual mixing, if desired. After a short interval of time, the beverage will have filled the pipes 51, 54 and 54'', the liquid channels 72, 74 and 91 of the valve and the measuring chamber 77. It is assumed, however, that the parts of the valve 64 are positioned as shown in Fig. 3 of the drawings which is in its normal position when the machine is not being operated.

When the beverage entered the measuring chamber 77, the vent 150 was open and the float 148 at its lower position. Upon entry of the beverage, the upward surge is arrested by the baffle plate 148' preventing premature closure of the vent 150 until the beverage raises float 148. Closure of the vent 150 by the rising of the float may not be complete or absolutely gas tight, therefore, pressure of the freed gas in the chamber 77 is utilized to force the vent closure into a perfect seal with its valve seat by directing the gas pressure against the diaphragm 156 which exerts high upward pressure through the lever 159 and rod 149 to thoroughly seat the valve head 152 against its rubber seat.

The valve at the top of the carbon dioxide tank 57 may have been turned on when the above action was initiated or later when the machine is ready for service. In either case, the automatic gas regulator at the top of the tank is set to deliver carbon dioxide gas to the porous stone 82 at a certain pressure which depends on the amount of pressure required to serve a good palatable drink at any time demand is made.

When the proper coin is placed in the receiver slide 137', i. e. a five cent piece, the slide is pushed inwardly by the customer until the coin falls into the slot 139 where it rests upon the stop 138'', and causes lever end 138''' to assume operative position in slot 139. By a placard on the front of the cabinet, the customer is directed to either push the disc 14' by hand or press the treadle 119 by foot. Either hand or foot operation forces the rod 14 against the coin lever end 138''' and causes movement of the valve stem 69 until the valve stem end reaches the dotted line position in chamber 74 and the valve opening 92 enters the valve chamber 73.

Inward movement of the coin slide 137' operates the lever 190 and dispenses a cup onto the plate 165 within the cup holder frame 167. During the movement of the valve stem, cam 112 raised the rider 111 causing the screw 117 to strike the rod 149 and hence opening the vent valve 150 so that the beverage in the measuring chamber 77 flows by gravity through the hollow valve stem 91 and then into the pipe 75 to the spout 76. Before the beverage pours from the spout, the pin 175' has been moved and shifted the plate 165 and its cup beneath the spout, the plate being held in shifted position by the dog 180. The beverage pours quiescently into the cup along its side wall until the measured quantity from chamber 77 is dispensed. The transparent door 16 is then opened by the customer to obtain the cup of beverage. Closure of the door by operation of the spring 184 causes the tripper 186 to engage the dog 180 and release it from the opening 179 which releases the plate 165 so that its spring 166 can return the plate to its normal position. The machine is now ready for a repeat operation.

Whenever the container 25 becomes nearly empty, the float 31 falls and forces the rod 39 downwardly to engage the slot *a* in the coin slide 137' so that it can not be operated until the machine is recharged with beverage and the float 31 rises.

This invention may also be used for dispensing still beverages, non-carbonated, by disconnecting or closing the valve on the gas pressure line 56', and leaving the vent cock on the tank open.

Beverage dispensing machines in general use today mix flavored syrup and water charged with $CO_2$ gas known as "Vichy water." This mixing takes place only during operation of the machine in dispensing the beverage, and since the uncarbonated flavored syrup is added mechanically to the proper amount of carbonated water, the result is a lowering of the carbonation and an imperfect mixing, as there is no time for blending.

In applicant's machine the flavored syrup and plain water are thoroughly mixed manually and then the mixture is carbonated, no uncarbonated syrup being added to carbonated water to cause the loss of gas. This complete carbonation in my machine, and continuous charging of the mixture with $CO_2$ gas produces a highly palatable drink that is not unblended or flat as dispensed by other methods.

Having thus described my invention, what is claimed as new and desired to be secured by Letters Patent is:

1. A measuring chamber for liquids having a port at its bottom and a valved gas vent at its top, means for closing vent when the liquid in the chamber rises to a predetermined level, and other means operative by gas pressure to hermetically seal the vent.

2. The chamber recited in claim 1 wherein said other means includes a flexible diaphragm.

3. A measuring chamber for liquids having a port at its bottom and a valved gas vent at its top, means for closing the vent when the liquid in the chamber rises to a predetermined level, and other means operative by gas pressure to hermetically seal the vent, said other means being adjustable so as to allow easy and successful operation of same, said first recited means comprising a float having an upstanding stem with a valve head concentrically fixed thereto.

4. A measuring chamber for liquids having a port at its bottom and a valved gas vent at its top, means for closing the vent when the liquid in the chamber rises to a predetermined level, and other means operative by gas pressure to hermetically seal the vent, said other means being adjustable so as to allow easy and successful operation of same, said other means including a spring pressed diaphragm connected to a rocker arm for operating the stem of the valve.

5. A measuring chamber for liquids having a port at its bottom and a valved gas vent at its top, means for closing the vent when the liquid in the chamber rises to a predetermined level, and other means operative by gas pressure to hermetically seal the vent, said chamber including complementary parts threaded together so that the volume of the chamber can be varied by rotating one of the parts.

6. In a device for dispensing beverages, a large liquid container having a relatively small liquid outlet at its bottom, a tube in the outlet having its upper end just above the outlet and its lower end connected to a supply of gas, a porous element attached to the upper end of the tube for diffusing gas into the liquid as it runs to the outlet.

7. In a device for dispensing beverages having a source of beverage, a valve, coin receiver, inclined pouring spout and cup holder, liquid passage means connecting the source, valve and pouring spout for delivery of beverage from the spout when the valve is opened, shifting means connected to the coin receiver and the cup holder for discharging a cup to a support when the receiver is moved, means connected to a portion of the valve for shifting the top of the cup just beneath the spout when the valve is moved toward open position for discharge of beverage, said means connected to the valve including a lever having its top end hinged to the cup holder, and a rod having one end journalled to the portion of the valve and the other end hinged to the lever.

8. In a device for dispensing beverages, a reservoir for the beverage having an outlet therefor, gas diffusing means at the outlet of the reservoir having connection with a container of high gas pressure and maintaining the beverage of the reservoir under high gas pressure, a measuring chamber having an exhaust port at its top and valve means therefor operated by a linkage means, a main valve mechanism and a discharge spout, duct means connecting the reservoir with the chamber through the valve mechanism, and another duct means connecting the valve mechanism with the spout, lever means for operating the linkage means and the valve mechanism, the lever having three positions, the first position allowing beverage to flow from the reservoir to the chamber under high pressure, the second position allowing the pressure to drop in the chamber by opening the port, and the third position allowing the beverage to flow to the spout by gravity and discharge therefrom.

9. The device recited in claim 8 wherein disc means is provided in connection with the measuring chamber and operable by gas pressure in the chamber to positively close the exhaust port.

10. In a dispensing device for liquids, a reservoir, valve, measuring chamber, inclined discharge spout, coin shifter, cup dispenser and cup positioner, a first duct means connecting the reservoir, valve and chamber, and a second duct means connecting the valve and spout, a push rod for operating the valve to allow liquid to flow from the reservoir to the measuring chamber and subsequently allowing liquid to flow from the chamber to the spout, bar means connected with the coin shifter and with the cup dispenser for releasing a cup when the shifter is moved in one direction, guide means to guide the cup onto a platform, lever means coupled to the push rod for forcing the cup beneath the inclined spout so that the top portion of the wall of the cup receives the liquid directly from the spout to reduce foaming.

GEORGE W. JOHNSON.